Aug. 22, 1967  J. W. BELL  3,337,868
COMBINED AIR SURVEILLANCE AND PRECISION
APPROACH RADAR SYSTEM
Filed April 15, 1964  6 Sheets-Sheet 1

INVENTOR.
JAMES W. BELL

ATTORNEY

INVENTOR.
JAMES W. BELL

ATTORNEY

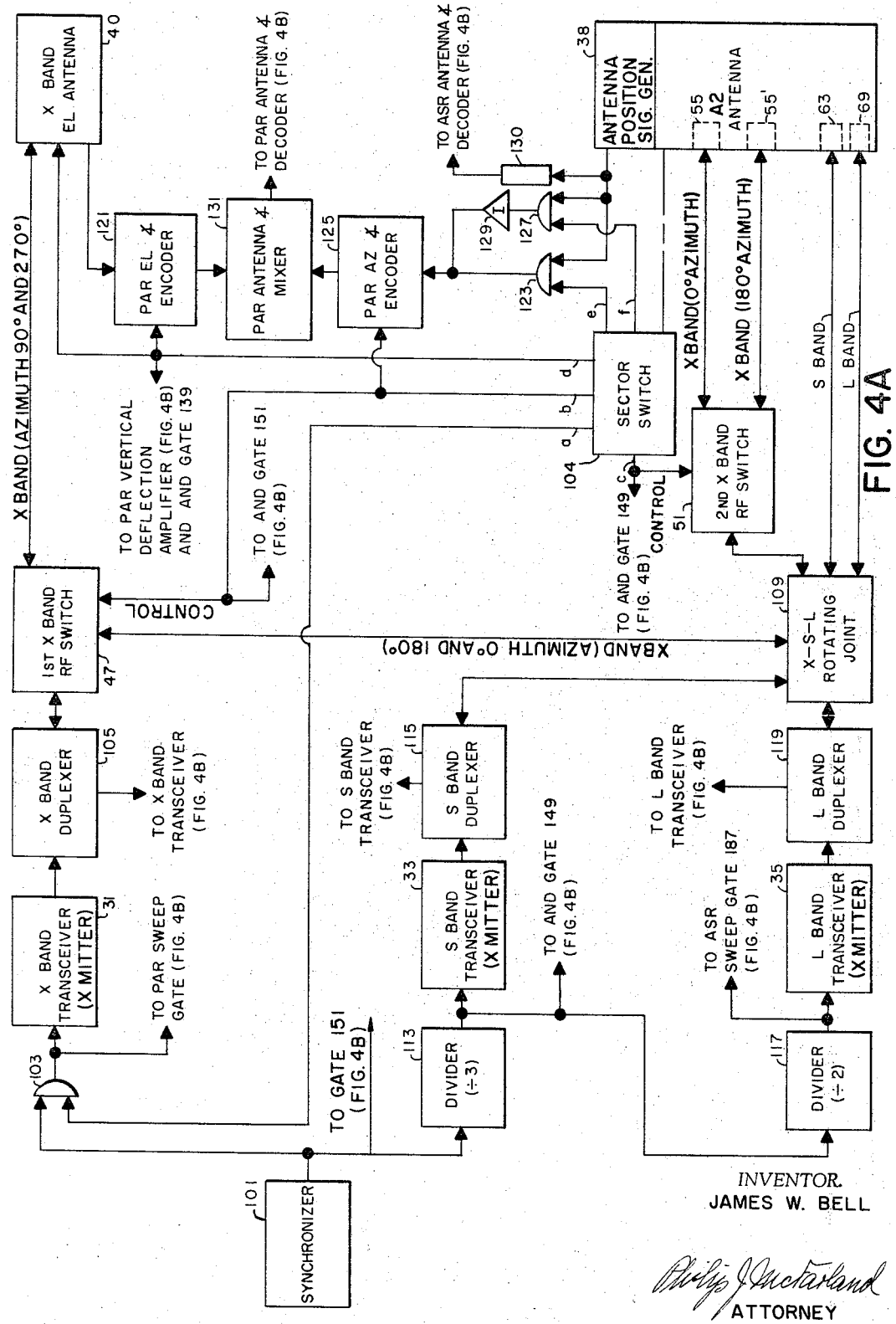

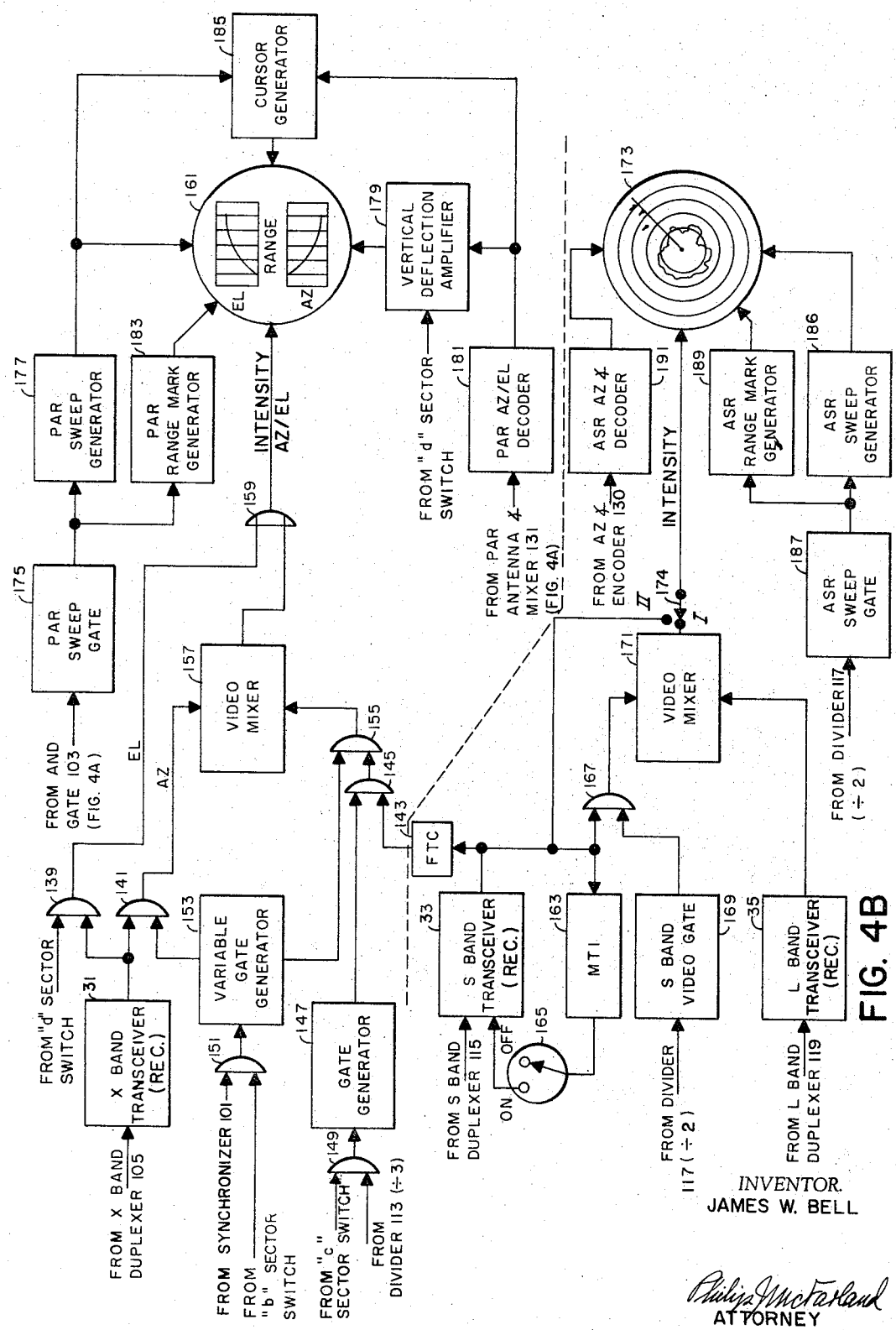

United States Patent Office 3,337,868
Patented Aug. 22, 1967

3,337,868
COMBINED AIR SURVEILLANCE AND PRECISION APPROACH RADAR SYSTEM
James W. Bell, Sudbury, Mass., assignor to Laboratory for Electronics, Inc., Boston, Mass., a corporation of Delaware
Filed Apr. 15, 1964, Ser. No. 360,017
6 Claims. (Cl. 343—11)

This invention pertains in general to radar apparatus and in particular to radar apparatus adapted to use in a system for the ground control approach of aircraft.

It is known in the art that the so-called combined "ground control approach" (GCA) radar, as exemplified by the AN/TPN-12 radar, may be used in a system for directing aircraft to a landing under conditions of poor visibility. The AN/TPN-12 radar operates either as a so-called "airport surveillance radar" (ASR) or as a so-called "precision approach radar" (PAR). In the ASR mode of operation, the AN/TPN-12 radar provides a conventional plan position indication of all aircraft around an airfield, while in the PAR mode it provides an indication (including elevation angle or altitude) of only the aircraft on final approach to the airfield. Thus, the combined GCA radar may take the place of two separate radars.

Satisfactory operation of a combined GCA radar such as the AN/TPN-12 may, however, be almost impossible during critical periods of time. Difficulty is especially apparent during periods of heavy precipitation when numbers of high performance aircraft must be guided to a landing in rapid succession. The difficulty derives from the "trade offs" made in the design of the equipment to permit both the ASR and the PAR mode of operation. For example, experience has proven that, for best overall performance, a combined radar must operate at as high a frequency as possible, say X-band. During periods of heavy precipitation, however, X-band radiation is more susceptible to attenuation in the atmosphere than radiation at a lower frequency, as S-band. This means, in turn, that the maximum dependable range of detection of targets is lowered, making guidance of high speed aircraft more difficult.

Another difficulty derives from the fact that it is impossible simultaneously to operate known combined GCA radars in the ASR and PAR modes. In the ASR mode a beam is swept continuously to illuminate any targets within the search field of the radar. In the PAR mode the beam is oscillated, in conjunction with a second beam, to illuminate a sector including the final approach path. Consequently, unless an aircraft has been tracked for a period of time sufficient for its time of arrival at the initial point of its final approach path to be determined precisely, the possibility exists that the aircraft may be lost during switchover from ASR to PAR.

Therefore it is an object of this invention to provide an improved ground control approach radar which is adapted to operate simultaneously in the ASR and PAR mode.

Another object of this invention is to provide an improved ground control approach radar which is adapted to the use of X-band, S-band and L-band for detecting, identifying and tracking aircraft.

A still further object of this invention is to provide an improved ground control approach radar which is mechanically simple and portable.

These and other objects of this invention are provided by a radar having a continuously rotating azimuth antenna which is continuously actuated by both an S-band transmitter and an L-band transmitter and intermittently actuated by an X-band transmitter. The antenna and the feeds therefor are so arranged that the X-band transmissions occur only when the antenna is scanning through a sector including the approach path for aircraft to a runway of an airfield. In addition, the radar includes a nodding X-band antenna which is actuated between periods of transmission of X-band from the azimuth antenna to determine the elevation angle of targets in the approach sector and, consequently, the altitude of aircraft on final approach to the runway. Two indicators are also provided to permit, at the same time, both an ASR and a PAR presentation. In addition, there are provided an X-band, an S-band and an L-band receiver, and means for mixing (interleaving returned echo signals to provide an output signal over a single line), as desired, output signals from the X and S-band receivers and the S and L-band receivers so that the PAR presentation shows the former mixed signals and the ASR presentation shows the latter. For a more complete understanding of the invention, reference is now made to the following detailed specification and to the attached drawings, in which:

Figure 1:
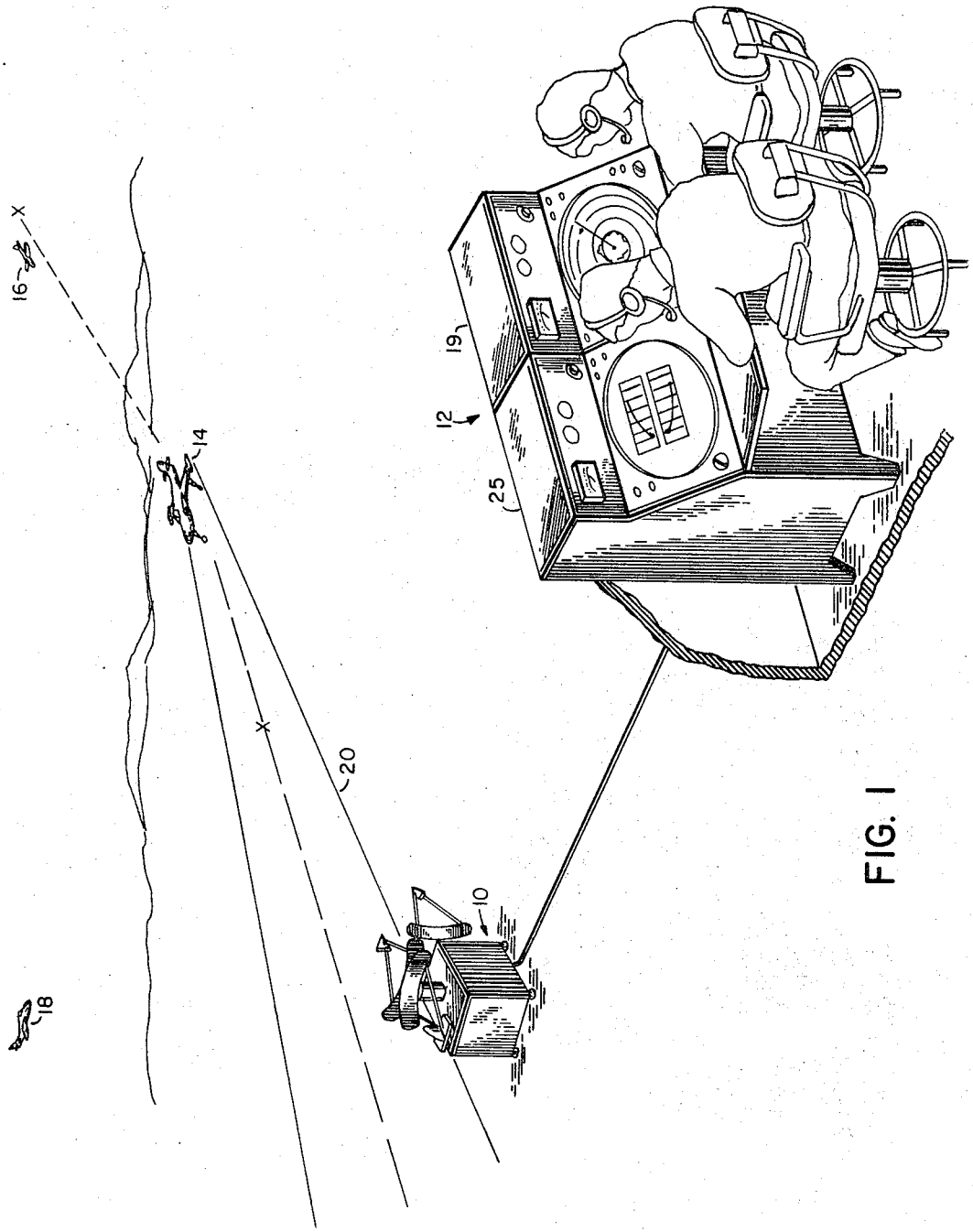
FIG. 1 is a simplified sketch showing the manner in which a system according to the invention is disposed on an airfield.
Figure 2:
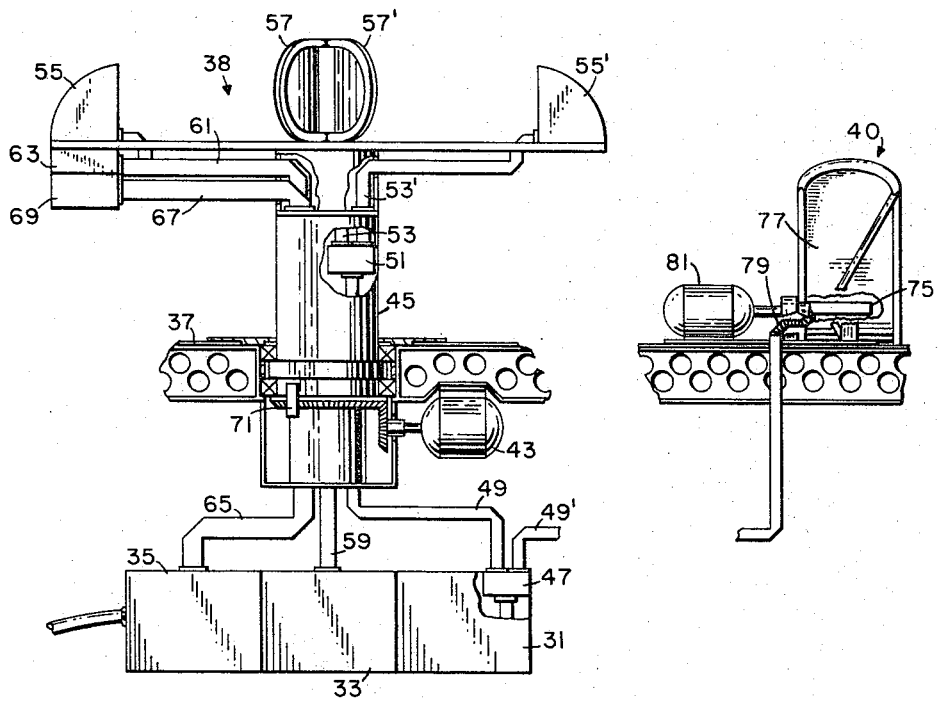
FIG. 2 is a side view, partially broken away, of the transmitter/receiver and the antenna portions of the system shown in FIG. 1.
Figure 5:
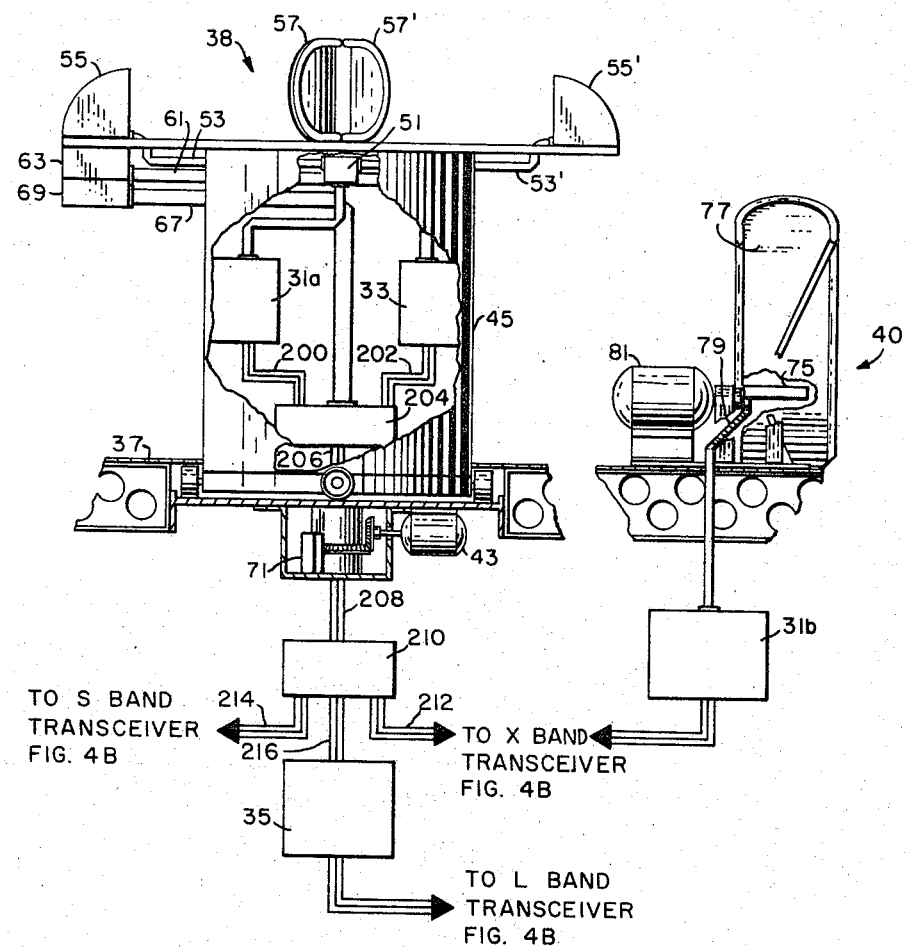

FIGS. 4A and 4B together constitute a block diagram of a preferred embodiment of the invention as shown in FIGS. 1 and 2; and FIG. 5 is a side view, partially broken away, of an alternative form of the transmitter/receiver and the antenna portions of the system shown in FIG. 2.

Referring now to FIG. 1, it may be seen that the system contemplated by the invention may directly supplant either the combination of an ASR and a PAR radar or the so-called "combined" ASR/PAR radar such as the AN/TPN-12. That is, the contemplated system comprises a radar group 10 and an indicator group 12 so arranged and connected that the azimuthal position of aircraft 14, 16, 18 within a predetermined range, say 200 miles, of an airfield may be observed on a plan position indicator (PPI) 19 and, at the same time, the position of aircraft on final approach to a landing strip 20 on such airfield may be observed on an indicator 25. It is apparent that the contemplated system is adapted to perform the functions of at least two separate conventional radars. It will, however, become apparent hereinafter that the manner in which the contemplated system is arranged to operate is such that more efficient and dependable control of aircraft may be attained than with two separate systems.

Turning now to FIG. 2, it may be seen that the preferred embodiment of the radar group 10 comprises a conventional X-band transmitter/receiver unit 31, an S-band transmitter/receiver unit 33, and an L-band transmitter/receiver unit 35 (hereinafter sometimes referred to, respectively, as transceiver 31, 33 or 35) mounted on a conventional supporting structure 37. The latter element in turn supports an azimuth antenna assembly 38 and an elevation antenna assembly 40. The azimuth antenna assembly 38, mounted in appropriate bearings (not numbered) on the supporting structure 37, is rotated constantly in a predetermined direction, say clockwise, and at a predetermined r.p.m. by an electric motor 43 through appropriate gearing as shown.

The azimuth antenna assembly 38 further includes a columnar member 45 on which are mounted a conventional rotary joint (not shown) to pass X, S and L band energy. As is well known, the rotary joint permits the antenna assembly 38 to be continuously turned in azimuth, without any degradation of the transmitted energy, while the supporting structure remains stationary.

A timing switch (not shown for purposes of clarity) is also mounted on columnar member 45 and comprises six separate segments to generate a plurality of control signals (a–f) depicted in FIGS. 3(a) through 3(f). A moment's thought will make it clear that the timing switch may, for example, be a plurality of commutators affixed in any convenient manner to the columnar member 45 to produce the control signals shown in FIGS. 3(a) through (f)

It may be further observed that transceiver 31 is connected to wave guides 49 and 49', respectively, by way of an RF switch 47. X-band energy transmitted by waveguide 49 is coupled to a second RF switch 51 via the rotary joint and then through either waveguide 53 or 53' (depending on the condition of RF switch 51) to either feedhorns 55 or 55', respectively. The feedhorns 55, 55' in turn coact, respectively, with reflectors 57, 57', mounted back to back, to form independent beams of X-band energy. The S-band energy from the S-band transceiver 33 passes through a waveguide 59, the rotary joint and a waveguide 61 to feed an S-band feedhorn 63 while simultaneous therewith, L-band energy provided by transceiver 35 is fed to an L-band feedhorn 69 by way of waveguide 65, the rotary joint and waveguide 67. The S and L band feedhorns 63, 69 also coact with reflector 57 so as to produce beams which are, at least in azimuth, substantially coaxial with each other and with the X-band beam from the azimuth antenna assembly 38. The azimuth position of such beams are measured by the output signal of a conventional resolver 71.

The electric motor 43 is energized so as to drive, as shown, the rotatable portion of the azimuth antenna assembly 38 continuously in a predetermined direction. The S-band transceiver 33 and the L-band transceiver 35 then operate in conventional search mode. That is, S-band energy and L-band energy is transmitted in beams which are continuously scanned in azimuth. The X-band energy, however, is emitted from the azimuth antenna assembly 38 only when that assembly points toward the sector which includes the precision approach sector. It should be noted that inasmuch as feedhorns 63 and 69 are continuously excited with S and L-band energy, when feedhorn 55 is fed X-band energy, reflector 57 of azimuth antenna 38 produces three beams, X, S and L-bands, which are coaxial with each other. On the other hand, since reflector 57' cooperates only with feedhorn 55', upon energization of the latter, only one beam (X-band) is formed.

The supporting structure 37 also carries an elevation antenna assembly 40. This assembly comprises a feedhorn 75 cooperating with a reflector 77 so as to produce a beam of radiated energy which is narrow in the vertical dimension and relatively wide in the horizontal direction. The feedhorn 75 is fed through waveguide 49' and a section of flexible waveguide 79 when the first RF switch 47 is properly conditioned. The feedhorn 75 and the reflector 77 are oscillated together by a driving motor 81 energized by a control signal as shown in FIG. 3(g), thus causing the beam from the elevation antenna assembly 40 similarly to nod up and nod down in a vertical plane at the desired times. A resolver (not shown) but similar to the resolver 71 provides an output signal indicative of the instantaneous elevation angle of the X-band beam from elevation antenna assembly 40. In order to facilitate a complete understanding of the functions achieved by the transmitter and receiver portions of the invention depicted in FIGS. 4A and 4B, respectively, it is believed that it would be helpful to first discuss the nature and interrelations between the various control signals that are provided by the timing selector switch 104 (FIG. 4A) and illustrated in FIGS. 3(a)–3(f). It will be noted that each of the control signals illustrated in FIGS. 3(a)–(f) are referenced to one complete revolution (360°) of the azimuth antenna 38. Referring now to FIG. 3(a) there is shown the control signal a which is applied to gate 103 (FIG. 4A) to turn "on" the X-band transceiver 31 (FIG. 4A). During the time period when the control signal is in its high level transceiver 31 operates to transmit and receive signals in the X-band frequency range. In this respect it should be observed that the X-band transceiver is rendered operative, periodically, four times during each revolution of the azimuth antenna 38.

FIG. 3(b) represents the control signal b which is applied to first RF switch 57 to direct X-band energy to or from either the azimuth assembly 38 or the elevation antenna assembly 40. That is to say, when control signal b illustrated in FIG. 3(b) resides in its high level X-band energy is directed to antenna assembly 38 by way of rotating joint 109 (FIG. 4A), whereas during the period control signal b resides in its low level X-band energy is directed to elevation antenna 40 (FIG. 4A).

A comparison of FIGS. 3(a) and 3(b) reveal that, during transceiver 31 "on" times, X-band energy is alternately directed between azimuth antenna 38 and elevation antenna 40. For purposes of illustration this has been depicted by labelling the portions of control signals a and b which enable X-band energy to be transmitted to the azimuth antenna "AZ" while labelling the portions which enable X-band energy to be transmitted to the elevation antenna "EL."

In addition the control signal b is applied to azimuth encoder 125 (FIG. 4A) and to "AND" gate 151 (FIG. 4A) to enable each of these components when the signal is in its high level.

FIG. 3(c) represents the control signal c, which when applied to a second X-band radio frequency switch 51 (FIG. 4A), determines whether X-band energy fed to azimuth antenna assembly 38 energizes feedhorn 55 or feedhorn 55'. When control signal c resides in its high level X-band energy is transmitted to and from feedhorn 55 while X-band energy is transmitted to and from feedhorn 55' when the signal resides in its low level. Control signal c is also applied to AND gate 149 (FIG. 4B) to enable the same during the period the signal is in its high level.

FIG. 3(d) represents the control signal d, which is a complement of the control signal illustrated in FIG. 3(b), that acts to enable various elements to pass signals received by the elevation antenna 40. That is, the signal operates to enable elevation angle encoder 121 (FIG. 4A), AND gate 139 (FIG. 4B), and vertical deflection amplifier 179 (FIG. 4B) during its hight level periods.

FIGS. 3(e) and 3(f) illustrate control signals which are complements of each other and operate to enable AND gates 123 and 127, respectively, during their respective high levels to pass azimuth antenna bearing information to the reeciver portion of the apparatus.

Lastly, FIG. 3(g) represents the control signal applied to an elevation drive motor for oscillating the elevation antenna 40 in the periods of time between those in which the azimuth antenna is energized with X-band energy. That is, the first pulse causes the elevation antenna to nod in an upward sweep while the second pulse operates to cause the elevation antenna to nod in a downward direction. Of course, as can be readily seen from a comparison of control signals a, b and g the elevation antenna 40 is excited by X-band energy while being nodded up and down through an elevation precision scan.

Before referring to FIGS. 4A and B it should be noted that the transceivers 31, 33, 35 have, for convenience, been shown in both figures. It will become apparent, however, that the transmitter portion of each of the transceivers is shown in FIG. 4A and the receiver portion of each is shown in FIG. 4B. It will be further noted that each of the transceivers, when turned "on," operate in the conventional interrupted continuous wave (ICW) mode at their respective pulse repetition frequencies (PRF).

This enables the transceivers to alternatively transmit and receive over a single antenna while still maintaining a high degree of isolation between the transmitter and receiver.

Figure 3:
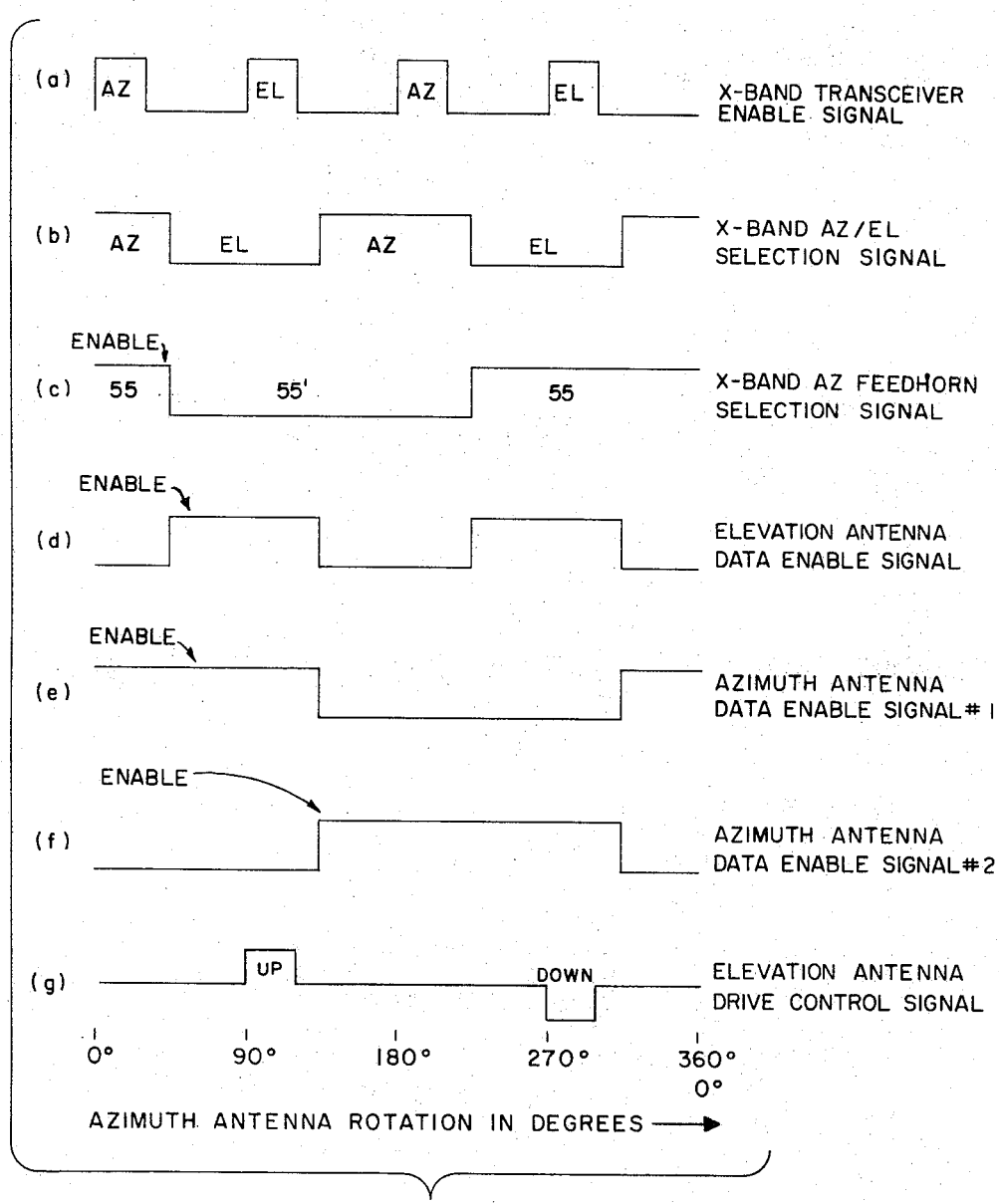
FIG. 3 is a timing diagram showing the manner in which synchronization between the various transmitter/receiver units is attained.

Referring now to FIGS. 4A and 4B together it may be seen that the system is basically controlled by a conventional synchronizer 101. This unit is preferably an oscillator having an output, in the order of say 4200 cycles per second, feeding into appropriate shaping circuits so as to produce, repetitively, a trigger pulse output. The output of the synchronizer 101 is fed to an AND gate 103 which is enabled by a signal of the form shown in FIG. 3(a) from a sector switch 104. Thus during the period control signal a resides in a high level X-band transreceiver 31 is turned "on" to receive and transmit at the PRF rate of synchronizer 101. The trigger pulses which pass through the AND gate 103, in turn, trigger the transmitter section of the transceiver 31. The output signal of this element is passed through an X-band duplexer 105 (provides two way operation for transmission and reception) and thence to the first RF switch 47. The just named switch is conventional and its condition is governed by the control signal b in a manner previously described. Consequently, the X-band signal coupled to the first RF switch 47 is passed either to azimuth antenna 38 by way of a rotating joint 109 or to the X-band elevation antenna assembly 40. The X-band signal through the rotating joint 109 passes to the second RF switch 51 and thence to either the feedhorn 55 or 55' as described hereinbefore. The condition of the second RF switch 51 determines whether the energy is sent to feedhorn 55 or feedhorn 55' in accordance with a waveform such as shown in FIG. 3(c). The signal out of the synchronizer 101 is also sent to a divider 113. This element is set, in a practical embodiment of this invention, so as to produce one output pulse for every 3 pulses out of the synchronizer 101. The output of the divider 113 is fed into the transmitter portion of the transceiver 33. The radio frequency output of that element is passed through an S-band duplexer 115 and thence through the rotating joint 109 to the feedhorn 63. The output of the divider 113 is also fed to a divider 117 which is here set so as to produce one output pulse for each 2 input pulses thereto. The output of the divider 117 is fed to the transmitter portion of the transceiver 35 and the radio frequency output of that transmitter is fed to an L-band duplexer 119 to the rotating joint 109 and thence to the feedhorn 69. It will be recognized that the L-band may be used to continuously interrogate for IFF purposes a transponder carried by the aircraft. Thus, X-band, S-band and L-band signals may be emitted from the azimuth antenna assembly 38. In summary, during each revolution of the azimuth antenna 38, S-band and L-band energy are continuously transmitted and received at their respective PRF frequencies over azimuth antenna 38 via reflector 57. On the other hand X-band energy is transmitted and received only during a predetermined portion of the revolution of the azimuth antenna 38 and even then the X-band energy is alternatively directed between azimuth antenna 38 and elevation antenna 40 in accordance with the condition of RF switch 47. That is, as the reflector 57 of azimuth antenna 38 turns into the precision approach sector, transreceiver 31 is turned "on" by control signal a. Since control signals a, b and c, respectively, are all in their high levels during this time (as can be seen from an inspection of FIG. 3), X-band energy is directed over azimuth antenna 38 by way of RF switch 47, rotating joint 109, RF switch 51, feedhorn 55 and reflector 57. As reflector 57 rotates out of the desired sector, control signal b drops to a low level. Consequently, when the transreceiver 31 is again turned on, X-band energy is directed to and from elevation antenna 40. At the same time control signal g causes the elevation antenna to sweep in an upward direction through an elevation precision scan. Azimuth antenna 38 continues to rotate thereby turning reflector 57' into the precision approach sector. At this time transreceiver 31 is turned "on" and X-band energy directed to azimuth antenna 38 by way of feedhorn 55' (compare control signals a, b and c at azimuth antenna rotation of approximately 180°). As the azimuth antenna 38 continues to rotate, control signal b again drops to a low level. As a result when transreceiver 31 is turned "on" by control signal a, X-band energy is directed to and from elevation antenna 40. Simultaneous with the enabling of transreceiver 31, control signal g is coupled to elevation antenna 40 to cause the latter to nod down through an elevation scan. Of course, the above described sequence is repetitive for each revolution of antenna 38 as the latter scans in azimuth the surrounding area.

The position of the elevation antenna assembly 40, in the form of an electrical signal out of a resolver (not shown in FIG. 4A) is fed into a PAR elevation angle encoder 121 (which element is enabled by a signal such as is shown in FIG. 3(d). The azimuthal position of the azimuth antenna assembly 38 (in the form of an electrical signal out of the resolver 71 shown in FIG. 2) is fed simultaneously to one input of AND gates 123 and 127, respectively. Both signals from the resolvers (representing elevation and azimuth antenna bearings) may take the form of a modulated periodic reference signal having an envelope which indicates the instantaneous angular position of the azimuth antenna which is then converted into a series of pulses by an appropriately located threshold detector (not shown). For purposes of description and by way of example, only, each pulse represents one degree of antenna rotation. Gates 123 and 127 are enabled by control signals e and f, respectively, which as previously mentioned are complements of each other. That is, when control signal e is in its high level azimuth antenna 38 bearing information is passed through gate 123 to PAR azimuth angle encoder 125. When control signal e falls to its low level control signal f rises to its high level. Consequently, azimuth antenna 38 bearing position pulses are then passed through gate 127 to encoder 125. Since the pulses which pass through gate 127 represent the second half of rotation of azimuth antenna 38, these pulses are inverted by inverter 129 (to a negative polarity) prior to being coupled to encoder 125. This enables the Beta Scan display (described later) to accurately sense the bearing position of azimuth antenna 38 after the pulse signals are subsequently converted to analog form. Both encoders 121 and 125 are well known and may be either registers or conventional counters whose function is to continually sense and then pass on in digital form the elevation antenna and azimuth antenna, respectively, bearing positions. Encoders 125 and 121 are enabled by control signals b and d, respectively, which as previously described are complements of each other. Accordingly, encoders 125 and 127, alternatedly provide signal outputs to PAR antenna mixer 131 when enabled by the high level of control signals b and d, respectively.

Thus, when the output of the PAR elevation angle encoder 121 and the output of the PAR azimuth angle encoder 125 are fed into a PAR antenna angle mixer 131, the necessary angle position signals (which occur during mutually exclusive periods of time) may be transmitted over a common line. The signal out of the resolver 71 is continuously also fed to an ASR azimuth angle decoder 191 (FIG. 4B), to convert the pulse signal to a continuously varying voltage signal which in turn is applied to cathode ray tube (CRT) 173 to drive a rotatable deflection magnetic yoke associated with the CRT 173, so as to synchronize the rotational movement of the magnetic yoke with the rotation of the scanning azimuth antenna 38. In this manner, the instantaneous azimuth position of azimuth antenna 38 is continuously presented on CRT 173 as the antenna scans in azimuth in the search operation. It should be noted here in passing that the various elements making up the just-described means for transmitting angular information are each conventional and well known in the art. For example, the bearing encoder of the AN–TPN/12 may be used. Prior to a detailed discussion of the components comprising the receiver section of the present invention, it should be reiterated that, when turned "on," X-band transreceiver 31, S-band transreceiver 33, and L-band transreceiver 35 continuously transmit and receive signals at their respective PRF frequency rates. Accordingly, the transmit and receive operations are intermittently performed.

Referring now to FIG. 4B, it may be seen that the receiver may be generally divided into two sections as indicated by the dotted line. The section below the dotted line detects S and L-band video signals received by azimuth antenna 38 as the latter continuously scans the surrounding area (ASR) and feeds the information to the Cathode Ray tube 173 (PPI indicator). The section above the dotted line contains the necessary components to detect the echo signals as the apparatus scans through the precision approach sector and couple it to Cathode Ray tube 161. The upper section may in turn be divided into two subsections, one for receiving data signals from elevation antenna 40 and the other for receiving data signals picked up by the azimuth antenna 38. The elevation signal detection channel comprises X-band transreceiver 31, AND gate 139, and OR gate 159 while the azimuth signal channel comprises gate 151, variable gate generator 153, gate 141, gate 149, gate generator 147, AND gates 145, 155, video mixer 157 and OR gates 159. X-band echo signals are passed through the X-band duplexer 105 to the receiver portion of the transceiver 31 and the S-band echoes are passed through the S-band duplexer 115 to the receiver portion of the transceiver 33 and the L-band echo signals are passed through the L-band duplexer 119 to the receiver portion of the transreceiver 35. The video signals out of the transceiver 31 are led to an AND gate 139 and to an AND gate 141. The AND gate 139 is enabled by a signal of the form shown in FIG. 3(d) so that the output of that gate pass video signals corresponding to all the X-band echoes received by the X-band elevation antenna assembly 40. That is, control signal d, which is a complement of control signal b, enables AND gate 139 only when elevation antenna 40 is connected to X-band transreceiver 31 by way of RF switch 47 (control signal b in low level). Thus, during this period echo signals received by elevation antenna 40 are passed through AND gate 139, or gate 159 to the intensity electrode of Cathode Ray tube 161. Simultaneously, control signal d is applied to vertical deflection amplifier 179 to bias the latter element in such a manner that the video signals from elevation antenna 40 are directed to the elevation (EL) range portion of Cathode Ray tube 161. Also, in this same time period, control signal d enables PAR EL angle encoder 121 (FIG. 4A). Thus, a pulse signal representing elevation antenna 40 orientation (bearing) is gated out of encoder 121, and through mixer 131, to the PAR elevation decoder 181, wherein the pulse signal is converted to a continuously varying voltage level indicative of instantaneous angular position of elevation antenna 40. This latter voltage signal is coupled to the vertical deflection plates of CRT 161 to provide vertical deflection in accordance with the elevation antenna angular position. In this manner the instantaneous angular position of the elevation antenna is presented along the vertical coordinate of the elevation portion of CRT 161.

The AND gate 141 is, as will now be shown, enabled so as to pass a predetermined portion of the video signals corresponding to the X-band echoes received by the azimuth antenna assembly 38. Trigger pulses from the synchronizer 101 are passed to an AND gate 151 which is enabled by control signal b so as to trigger a variable gate generator 153 each time X-band energy is emitted from the azimuth antenna assembly 38. The variable gate generator 153 may simply be a monostable multivibrator having an adjustable period which is less than the period between pulses out of the synchronizer 101. Inasmuch as the operation of generator 153 is controlled by the condition of AND gate 151 which in turn is enabled only when control signal b is in its high level, it is obvious that X-band signals received by azimuth antenna 31 are passed through AND gate 141 and video mixer 157 to CRT 161 in the time intervals between the periods gate 139 is enabled to pass X-band signals received by elevation antenna 40. This follows since gate 139 is enabled by control signal d which is a complement of control signal b. Thus, data signals received by way of elevation antenna 40 and azimuth antenna 38 are alternately displayed by Cathode Ray tube 161. On this regard it will be noted that during the period AND gate 141 is enabled to pass X-band signals from azimuth antenna 38 control signal d is in the low level thereby biasing vertical deflection amplifier 179 in such a manner as to direct the received signals to the azimuth portion of the CRT 161. Also, during this same time interval, control signal b enables PAR azimuth angle encoder 125 to provide the instantaneous angle position of azimuth antenna 38 by way of PAR antenna mixer 131 and PAR azimuth elevation decoder 181. PAR decoder 181 operates to convert the pulse signal output of azimuth angle encoder 125 to a continuously varying voltage signal indicative of azimuth antenna 38 angular position. This voltage signal is coupled to the vertical deflection plates of CRT 161 to move the electron beam vertically in accordance with the decoded azimuth angle information along the vertical coordinate of the azimuth display portion of CRT 161.

The complementary output of variable gate generator 153 is applied to gate 155 to allow video signals in the S-band frequency range to supplement the X-band video signals derived from azimuth antenna 38. That is, it will be recalled that S-band energy is continuously radiated from azimuth antenna 38 by way of reflector 57. To take advantage of the S-band frequency, for precision approach purposes, control signal c is coupled to AND gate 149 to enable the latter element as reflector 57 passes through the precision approach sector. The S-band PRF frequency derived from divider 113 (FIG. 4A) is coupled by way of gate 149 to gate generator 147 to thereby operate the latter element at the S-band PRF frequency. Gate generator 147 may for example, be a conventional flip flop or monostable multivibrator. The signal output of gate generator 147 is in turn coupled to one input of the AND gate 145. The other input of the AND gate 145 is derived from S-band transreceiver 33 by way of the fast time constant circuit 143. This latter circuit is well known in the art and generally comprises an amplifier having a grid input circuit with a relative short time constant as compared to the period of the input signal. As a result the amplifier is able to follow the received S-band frequency signal without any appreciable smearing or degradation of the information. It will be recognized that gate generator 147 and S-band transreceiver 33 are operated in synchronism at the S-band PRF frequency [both elements are turned "on" by the signal derived from divider 113 (FIG. 4A)]. It follows that AND gate 145 (when gate generator 147 is activated) acts to pass received S-band energy to AND gate 155 each time such energy is detected by the receiver portion of transreceiver 33. The S-band energy in turn is passed to video mixer 157 when AND gate 155 is enabled by variable gate generator 153. Since AND gates 155 and 141, respectively, are alternately enabled by variable gate generator 153, it is apparent that X-band video signals and S-band video signals derived from azimuth antenna 38 are coupled to video mixer 157 during mutually exclusive time periods.

Video mixer 157 is a composite signal indicative of a mixture of X-band and S-band echoes from targets inside the maximum range of targets detectable by X-band transmissions as the azimuth antenna 37 rotates through the precision approach sector. The adjustment of the variable gate generator 153, obviously, may be changed as desired to accommodate for differing atmospheric conditions. The output of the video mixer 157 and the output of the AND gate 139 are passed to an OR gate 159 which, in turn, is connected to an intensity control electrode of a cathode ray tube 161.

The output of the receiver portion of the transceiver 33 is also fed through a conventional moving target indicator (MTI) 163 to an on-off switch 165 so that, if desired, only moving targets are detected. The output of the receiver portion of the transceiver 33 is also continuously fed to an AND gate 167 which is enabled by the output of an S-band video gate generator 169. The latter element may be a conventional flip-flop triggered on the output of divider 117 of FIG. 4A. That is, the S-band video gate is operated at the same PRF frequency as L-band transreceiver 35. Thus, video from every other range sweep of the S-band receiver (which is operated at twice the PRF frequency) is passed to a video mixer 171. The second input to the video mixer 171 is the video output of the reciever portion of the transceiver 35. It should be noted that S-band video gate 169 acts to enable AND gate 167 when the transmitter portion of L-band transreceiver 167 is "on" and to disable AND gate 35 when the receiver portion of L-band transreceiver is "on." This means that S-band and L-band energy is coupled to video mixer 171 at alternate times. Thus, video mixer 171 (like video mixer 157) operates to interleave the video signals at the two frequencies and provides an output over a single line. The output of the video mixer 171 is fed to an intensity control electrode of a cathode ray tube 173 when a switch 174 is in the position I, as shown. When switch 134 resides in the position II, video from every range sweep of the S-band is passed directly to the intensity electrode of the cathode ray tube 173.

Although the function of several of the components associated with the CRT 161 and the CRT 173 have been mentioned in connection with the description of the receiver circuitry, it is believed that it will be helpful to briefly discuss the functions of all the elements as utilized to actuate the indicators. It will be recognized by those skilled in the art that the hereinafter described components are conventional and well known. Accordingly, no attempt will be made to describe the components in detail. The presentation on the cathode ray tube 161 is preferably a so-called "beta" scan as shown. Thus, to derive the deflection voltages for a beta scan, a signal from the AND gate 103 (FIG. 4A) is passed to a PAR sweep gate generator 175. The output of the sweep gate generator 175, in turn, energizes a PAR sweep generator 177 and the output of that element is impressed on the horizontal deflection electrodes of the cathode ray tube 173. The vertical deflection of the cathode ray tube 161 is derived from a vertical deflection amplifier 179 which is energized by a PAR AZ/EL decoder 181 responsive to the output of the PAR antenna angle mixer 131 of FIG. 4A. The vertical deflection amplifier 179 is also controlled by a signal of the form shown in FIG. 3(d). This signal biases the vertical deflection amplifier 179 in such a manner as to separate the azimuth range display from the elevation range display on the face of the cathode ray tube 161. Range marks, comprising vertical lines along the face of the cathode ray tube 161 are generated by a PAR range mark generator 183 in association with the PAR sweep generator 177. To complete the display on the face of the cathode ray tube 161, cursor lines indicating a glide path and a course line are generated in a cursor generator 185 in response to signals from the PAR sweep generator 177 and the PAR AZ/EL decoder 181.

The range sweeps for the conventional PPI display on the face of the cathode ray tube 173 are generated by a sweep generator 186 in response to gates from a sweep gate generator 187. The latter element is, in turn, controlled by triggers from the divider 117. Further, range marks, formed in a range mark generator 189 under the control of the sweep gate generator 187, are impressed on the cathode ray tube 173. The azimuthal position of the range sweep on the face of the cathode ray tube 173 is controlled by signals from an azimuth angle decoder 191 operating to move, or energize, the deflection elements of the cathode ray tube 173 in an appropriate manner. The output of the azimuth angle decoder 191 is, of course, dependent upon the signal that that element receives from the azimuth angle encoder 130 of FIG. 4A.

From the foregoing description, it is obvious that a PAR and an ASR display are provided simultaneously in a system according to this invention. Further, the targets shown on the AZ portion of the PAR display are the result of supplementing X-band video with S-band video, while the targets shown on the ASR presentation are the result of interleaving S-band and L-band video. Since the S-band is in a lower portion of the frequency range of the electromagnetic spectrum than the X-band, it is attenuated less by extreme weather conditions such as rain, snow or fog. To obtain maximum area coverage during the precision approach interval under adverse conditions, it is thus best to utilize the S-band frequency range to the extent possible. When heavy precipitation limits the detection range of targets by X-band pulses, the adjustment of the variable gate generator 153 may be changed so that video from the S-band receiver appears at a shorter range. Since the video from the S-band receiver has been passed through a fast time constant circuit, little smearing of such signals is experienced. The net result is that targets in the azimuth portion of the illustrated PAR presentation show up as pips at a greater range that would be the case if only video from an X-band receiver were present. Obviously, however, the setting of the variable gate generator 153 should be adjusted as operating conditions change so that as much of the X-band as is possible is shown on the face of the cathode ray tube 161. That is, the X-band being in the short wavelength range enables the system to operate with greater antenna directivity and higher resolution characteristics. Accordingly, weather conditions permitting, it is apparent it would be best to take advantage of these X-band characteristics. This is carried out by adjusting the time constant of variable gate generator 153 so that AND gate 141 is enabled for a longer time period than AND gate 155. As a result, the intensity control electrode of CRT 161 is predominately driven by X-band video. There is, it should be noted, no requirement that the two types of video be presented in mutually exclusive periods of time on CRT 173 as there is on the face of the cathode ray tube 161. Therefore, there is no requirement that, in the combining circuit for the S-band and L-band video that there be a variable gate generator similar to the variable gate generator 153.

The embodiment of the radar group shown in FIG. 5 has been, for ease of explanation, simplified in that two X-band transceivers, here labelled 31a and 31b, are shown. Further, such conventional elements, as duplexers, have not been shown and elements in FIG. 5 which correspond to elements in FIG. 2 have been similarly numbered.

Referring now to FIG. 5 it may be seen that an X-band transceiver 31a and an S-band transceiver 33 are mounted on the rotatable portion of an azimuth antenna assembly 38. Both such transceivers, along with an L-band transceiver 35 and an X-band transceiver 31b (connected as shown) are operated as described hereinbefore. That is, the various transceivers are programmed by the control signals shown in FIG. 3, except that X-band transceivers 31a and 31b are enabled alternately by the X-band AZ/EL selection signal shown in FIG. 3b. The X-band echo signals to X-band transceiver 31a are heterodyned to produce a signal on an output line 200 on a carrier of, say 60 mc., and the S-band echo signals to the S-band transceiver 33 are heterodyned to produce a signal on an output line 202 on a different carrier, say 90 mc. Output lines 200, 202 are connected, along with a coaxial cable 67' for the L-band transmitted and received signals, to a conventional triplexer 204. The just named element consists simply of a bank of band pass filters for each of the applied frequencies. In the present case, the triplexer 204 passes 60 mc., 90 mc. and 1090 mc. (L-band). A coaxial cable 206 is connected to the triplexer 204 and, through a conventional coaxial rotating joint (not shown), to a coaxial caable 208 which feeds a triplexer 210. The triplexer 210 is, preferably, the same as triplexer 204 except that it is connected in reverse of that triplexer. In other words the various band pass filters in triplexer 210 are each connected, by way of cables 212, 214, 216 to the IF amplifiers in the X-band transceiver 31, and in the S-band transceiver 33 and to the input of the receiver portion of the L-band transceiver 35.

Further modifications to the system just described will become immediately apparent to those having skill in the art. For example, it would be simple to arrange the control for the L-band transmitter and its receiver portion so that the transceiver 35 would respond to interrogating signals from an aircraft rather than transmitting interrogating signals constantly. Further it will be apparent to those having skill in the art, that the antenna system described herein may be modified to produce circular polarization of the emitted energy. Still further, it is apparent that the particular pulse repetition frequencies of the various transmitters may be changed at will so long as the pulse repetition frequencies actually use our integral multiples of each other. It is felt, therefore, that the invention should not be limited to the illustrated embodiments thereof, but rather should be limited only by the spirit and scope of the appended claims.

What is claimed is:

1. A ground controlled approach radar system operative simultaneously as an airport surveillance radar and as a precision approach radar, comprising:
    (a) a beam forming antenna continuously scanned in azimuth to scan, periodically, a sector including an approach path for aircraft to an airstrip;
    (b) means for energizing the antenna, in synchronism with system trigger pulses of a predetermined repetition frequency, with pulses of X-band energy when such antenna points toward the sector;
    (c) means for continuously energizing the antenna, in synchronism with trigger pulses of a repetition frequency which is an integral sub-multiple of the repetition frequency of the system triggers, with pulses of S-band energy;
    (d) means for receiving energy reflected back from targets illuminated by transmitted energy at both X and S band;
    (e) a plan position indicator for displaying signals representative of targets illuminated by S-band energy;
    (f) a second indicator for displaying signals representative of targets within the approach path sector.

2. A ground controlled approach radar system as in claim 1 further comprising:
    (a) a variable gate generator, operative in response to each of the system trigger pulses when X band energy is propagated in the sector, to generate, successively, a first and a second gating signal, the length of each such gate being inversely variable with respect to the other;
    (b) a second gate generator, operative in response to the trigger pulses when the antenna points toward the sector, to generate a third gating signal;
    (c) a video mixer in circuit with the second generator;
    (d) means for feeding signals representative of targets illuminated by X band energy into the video mixer when such signals coincide with the first gating signal; and,
    (e) means for feeding targets representative of targets illuminated by S band energy into the video mixer when such signals coincide with the second and the third gating signals.

3. A ground controlled approach radar system as in claim 1 wherein the beam forming antenna comprises:
    (a) two beam forming reflectors mounted back to back;
    (b) means for continuously energizing one of the reflectors with S band energy; and,
    (c) means for energizing that one of the two reflectors directed toward the sector with X-band energy.

4. A ground control approach radar system as in claim 3 and having, additionally:
    (a) a second beam forming antenna oscillated in elevation;
    (b) means for energizing the second antenna with X band energy during periods in which the first beam forming antenna points away from the sector; and,
    (c) means for displaying signals representative of targets illuminated by the X band energy from the second beam forming antenna on the second indicator.

5. A ground controlled approach radar system utilizing a continuously rotating beam forming antenna and pulses of electro-magnetic energy of at least two frequencies, comprising:
    (a) a continuously rotating beam forming antenna which periodically scans a sector including an approach path to an airstrip;
    (b) means for generating, in synchronism with a periodic trigger pulse, pulses of electromagnetic energy of a first frequency when the antenna points toward the sector and for continuously generating, in synchronism with a sub-multiple of the periodic trigger pulses, pulses of electromagnetic energy of a second frequency;
    (c) means for feeding all the pulses of electromagnetic energy to the continuously rotating beam forming antenna to provide, when such antenna points toward the sector, substantially coaxially disposed beams and, when such antenna is pointed away from the sector, a beam of electromagnetic energy at the second frequency;
    (d) means for generating a signal indicative of the instantaneous position of the continuously rotating beam forming antenna;
    (e) means for receiving energy reflected back from targets to provide video signals, such means including range gating means for providing a range sweep limited by the pulse repetition frequency of the electromagnetic energy of the first frequency.

6. A ground controlled approach radar system operative simultaneously as an airport surveillance radar and as a precision approach radar, comprising:
    (a) a beam forming antenna continuously rotated in azimuth to scan, periodically, a sector including an approach path for aircraft to an airstrip;
    (b) means, supported on the rotating portion of the beam forming antenna, for feeding such antenna with pulses of S-band energy at a first repetition frequency and for converting echo signals resulting therefrom to a first intermediate frequency;
    (c) means, supported on the rotating portion of the beam forming antenna, for feeding such antenna with pulses of X-band energy at a second repetition frequency integrally related to the first repetition frequency when such antenna scans the sector including the approach path, and for converting echo signals resulting therefrom to a second intermediate frequency;
    (d) means, including a pair of complementary filter banks and a first and a second amplifier, for converting the echo signals at the first and second intermediate frequency to video signals;
(e) a plan position indicator for displaying video signals representative of echo signals resulting from propagation of S-band energy; and,
(f) a second indicator for displaying video signals representative of targets within the sector, such indicator including gating means for selectively displaying signals representative of targets illuminated by X-band and S-band energy during mutually exclusive periods of time.

References Cited

UNITED STATES PATENTS

| | | | |
|---|---|---|---|
| 2,585,855 | 2/1952 | Sherwin et al. | 343—5 |
| 2,975,413 | 3/1961 | Landee et al. | 343—5 |
| 3,009,144 | 11/1961 | Landee | 343—5 |

RODNEY D. BENNETT, *Primary Examiner.*

CHESTER L. JUSTUS, *Examiner.*

P. M. HINDERSTEIN, D. C. KAUFMAN,
*Assistant Examiners.*